(12) United States Patent
Bossman et al.

(10) Patent No.: US 8,645,356 B2
(45) Date of Patent: Feb. 4, 2014

(54) ADAPTIVE QUERY EXECUTION PLAN ENHANCEMENT

(75) Inventors: Patrick D Bossman, Sarasota, FL (US);
Curt L. Cotner, Gilroy, CA (US);
You-Chin Fuh, San Jose, CA (US);
Adarsh R. Pannu, San Jose, CA (US);
Kun Peng Ren, Thornhill (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/431,981

(22) Filed: Mar. 28, 2012

(65) Prior Publication Data
US 2013/0262435 A1    Oct. 3, 2013

(51) Int. Cl.
*G06F 7/00*     (2006.01)
*G06F 17/30*    (2006.01)

(52) U.S. Cl.
CPC .... *G06F 17/30477* (2013.01); *G06F 17/30675* (2013.01); *G06F 17/30935* (2013.01); *G06F 17/30938* (2013.01)
USPC ........... 707/718; 707/713; 707/719; 707/721; 707/769

(58) Field of Classification Search
CPC ................... G06F 17/30477; G06F 17/30675; G06F 17/30935; G06F 17/30938
USPC .......................... 707/713, 718, 719, 721, 769
See application file for complete search history.

(56) References Cited

U.S. PATENT DOCUMENTS

| | | | |
|---|---|---|---|
| 6,466,931 B1 * | 10/2002 | Attaluri et al. | 707/999.003 |
| 6,763,359 B2 | 7/2004 | Lohman et al. | |
| 7,324,985 B2 | 1/2008 | Kaluskar et al. | |
| 2006/0074965 A1 * | 4/2006 | Cunningham et al. | 707/102 |
| 2007/0130107 A1 * | 6/2007 | Waas et al. | 707/2 |
| 2009/0327216 A1 * | 12/2009 | Brown et al. | 707/2 |
| 2009/0327242 A1 * | 12/2009 | Brown et al. | 707/3 |
| 2010/0114868 A1 * | 5/2010 | Beavin et al. | 707/718 |
| 2010/0125565 A1 * | 5/2010 | Burger et al. | 707/713 |
| 2010/0145929 A1 * | 6/2010 | Burger et al. | 707/713 |
| 2011/0055201 A1 * | 3/2011 | Burger | 707/719 |

* cited by examiner

*Primary Examiner* — Phong Nguyen
(74) *Attorney, Agent, or Firm* — North Shore Patents, P.C.; Michele Liu Baillie

(57) ABSTRACT

An adaptive query execution plan enhancement is provided by: selecting a sample of literal sets from an execution history of a query statement; determining a plurality of access paths by applying each literal set in the sample to the query statement; for each given access path of the plurality of access paths, determining a total execution cost by applying each literal set in the sample to the given access path; and selecting a preferred access path from the plurality of access paths based on the total execution costs for each given access path. A plurality of preferred access paths for a plurality of query statements in an application workload is collected and may be presented as a query execution plan enhancement recommendation to users.

18 Claims, 4 Drawing Sheets

ADAPTIVE QUERY EXECUTION PLAN ENHANCEMENT

BACKGROUND

A query optimizer is a component of a database management system that attempts to determine the most efficient way to execute a query statement. The optimizer considers the possible query execution plans for a given query statement and attempts to determine which of those plans will be the most efficient or cost effective. However, query statements with host variables and parameter markers in predicates may limit an optimizer's visibility regarding the data characteristics and predicate selectivity. As a consequence, the optimizer may take a guess during the course of cost estimation on the access path chosen for retrieving data during query execution. The access path selected by the optimizer is, therefore, unpredictable from a performance standpoint. Due to this limited visibility, the optimizer may select a sub-optimal access path which exposes the performance issues immediately, may select a reasonably good but not the optimal access path, or may select the optimal access path by chance since multiple occurrences of variables may cancel each other or issues with other optimizer input could offset the impact of the variables.

One existing approach is to modify an application source code to use literals in the predicates instead of host variables and parameter markers. With this approach, the optimizer is able to use all the available optimizer statistics to properly estimate the predicate selectivity. However, this approach increases the prepare cost since very likely the statements will no longer be repeating queries. The performance benefit does not necessarily justify the increased prepare costs.

Another existing approach uses re-optimization bind options to re-optimize the statement when literals are known at execution time. These options defer the optimization to the first execution, every execution, or selective executions when literals are known to the optimizer. However, when deferred to the first execution, the literals used may be outliers and produce an access path that is inefficient for the overall workload. The overhead costs of deferring the optimization to every execution or selective executions may not justify the performance benefits. Moreover, these options are usually supported by data servers at the package level and thus would apply to the whole package, which forces other statements in the package to incur the re-optimization costs unnecessarily.

Another existing approach uses optimizer hints to lock down the access path for statements that are subject to instability. However, this requires users to identify the affected statements and determine the best access path for each of them. This requires significant user bandwidth and the skill to implement.

Another existing approach is to support "parametric" access paths in the database server. Here, the optimizer would generate multiple access paths and associate the proper "predicate profile: for each of the access paths thus generated. At execution time, an access path is dynamically selected based on the predicate profile and the statement execution is dispatched accordingly. However, this solution is costly to implement. Further, when database applications are running against multiple data servers, not all data servers may support this feature.

SUMMARY

According to one embodiment of the present invention, a method for adaptive query execution plan enhancement by a computer system comprising a processor, comprises: selecting a sample of literal sets from an execution history of a query statement; determining a plurality of access paths by applying each literal set in the sample to the query statement; for each given access path of the plurality of access paths, determining a total execution cost by applying each literal set in the sample to the given access path; and selecting a preferred access path from the plurality of access paths based on the total execution costs for each given access path.

In one aspect of the present invention, for each given literal set in the sample, the determining the plurality of access paths by applying each literal set in the sample to the query statement comprises: generating a new query statement by substituting variables in the query statement with the given literal set; explaining the new query statement to obtain a given critical access path; associating the given critical access path with the given literal set; incrementing a hit count associated with the given critical access path; and incrementing a total sampling count associated with the query statement.

In one aspect of the present invention, the determining the total execution cost by applying each literal set in the sample to the given access path comprises: determining an elapsed time for execution of an original access path of the query statement against each literal set in the sample; for each given critical access path, determining an elapsed time for execution of the given critical access path against each literal set in the sample; and for each given critical access path, obtaining a total benefit for the given critical access path based on differences between the elapsed time for execution of the original access path and the elapsed time for execution of the given critical access path against each literal set in the sample, weighted by the hit count associated with the given critical access path.

In one aspect of the present invention, the selecting the preferred access path from the plurality of access paths based on the total execution costs for each given access path comprises: selecting the given critical access path with a highest total benefit as the preferred access path for the query statement.

In one aspect of the present invention, the selecting the given critical access path with a highest total benefit as the preferred access path for the query statement comprises: for each given critical access path, determining whether the total benefit for the given critical access path exceeds a pre-defined threshold; for each given critical access path, in response to determining that the total benefit for the given critical access path does not exceed the pre-defined threshold, discarding the given critical access path; and selecting, from the non-discarded given critical access paths, the given critical access path with the highest total benefit as the preferred access path for the query statement.

In one aspect of the present invention, the method further comprises: collecting a plurality of preferred access paths for a plurality of query statements in an application workload; and presenting the plurality of preferred access paths as a query execution plan enhancement recommendation.

System and computer program products corresponding to the above-summarized methods are also described and claimed herein.

DETAILED DESCRIPTION

Figure 1:
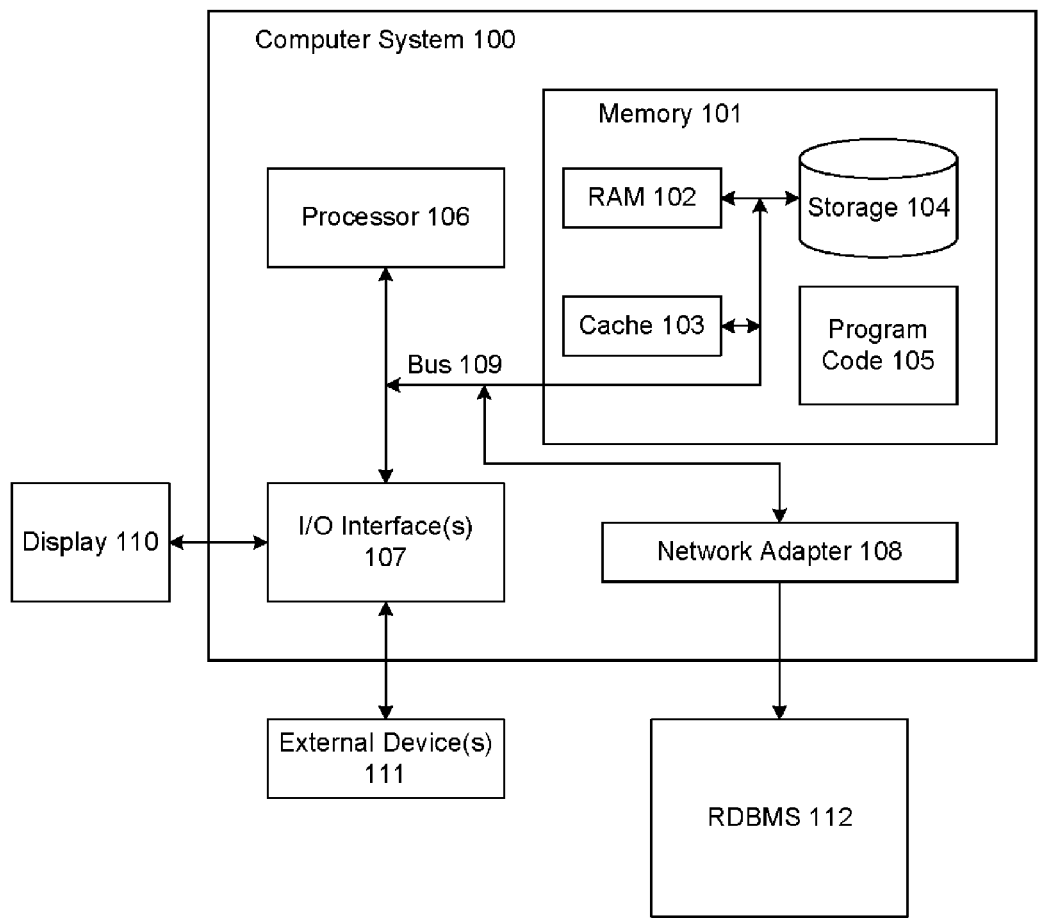
FIG. 1 illustrates an embodiment of a system for adaptive query execution plan enhancement according to the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (Java, and all Java-based trademarks and logos are trademarks of Sun Microsystems, Inc. in the United States, other countries, or both), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer special purpose computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

FIG. 1 illustrates an embodiment of a system for adaptive query execution plan enhancement according to the present invention. The computer system 100 is operationally coupled to a processor or processing units 106, a memory 101, and a bus 109 that couples various system components, including the memory 101 to the processor 106. The bus 109 represents one or more of any of several types of bus structure, including a memory bus or memory controller, a peripheral bus, an accelerated graphics port, and a processor or local bus using any of a variety of bus architectures. The memory 101 may include computer readable media in the form of volatile memory, such as random access memory (RAM) 102 or cache memory 103, or non-volatile storage media 104. The memory 101 may include at least one program product having a set of at least one program code module 105 that are configured to carry out the functions of embodiments of the present invention when executed by the processor 106. The computer system 100 may also communicate with one or more external devices 111, such as a display 24, via I/O interfaces 107. The computer system 100 may communicate with relational database management system 112 via network adapter 108.

Figure 2:
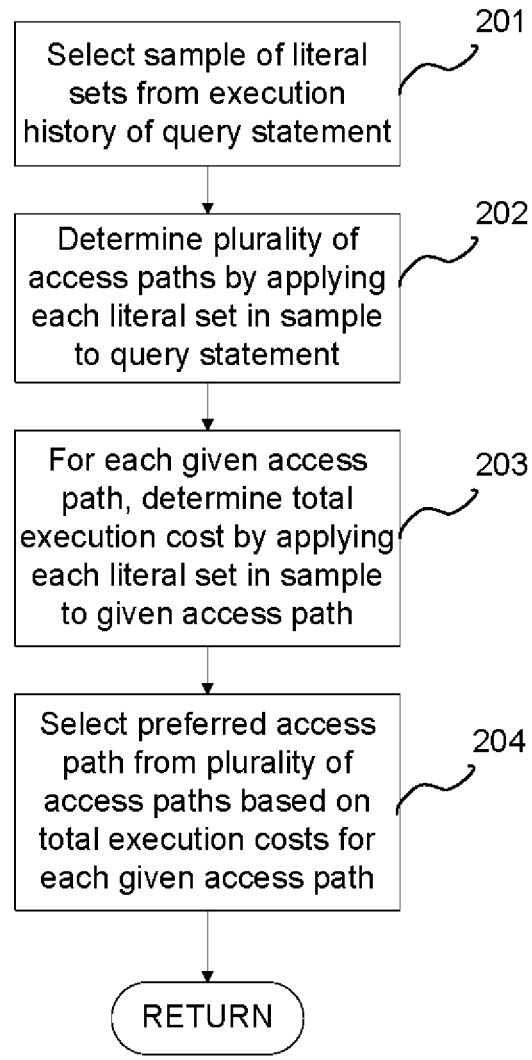
FIG. 2 is a flowchart illustrating an embodiment of a method for adaptive execution plan enhancement according to the present invention.

FIG. 2 is a flowchart illustrating an embodiment of a method for adaptive execution plan enhancement according to the present invention. In this embodiment, the method is implemented on the client side, i.e., application side, to adaptively tune a query statement to an optimal access path based on literal sets harvested in the execution history of the query statement. First, the method selects a sample of literal sets from the execution history of the query statement (201). The method then determines a plurality of access paths by applying each literal set in the sample to the query statement (202). For each given access path of the plurality of access paths, the method determines a total execution cost by applying each literal set in the sample to the given access path (203). The method selects a preferred access path from the plurality of access paths based on the total execution costs for each of the given access paths (204).

From a practical standpoint, a small number of access paths would be critical for a large number of executions of the same query statement. Therefore, by properly sampling the statement executions to harvest the literal sets, the optimizer is provided with sufficient information to discover these access paths. Literal sets may be captured using various techniques. In an application scenario, the literal sets may be captured by the runtime component. Literal sets may also be captured through the instrumentation information supported by a database server or through a network sniffing mechanism.

Figure 3:
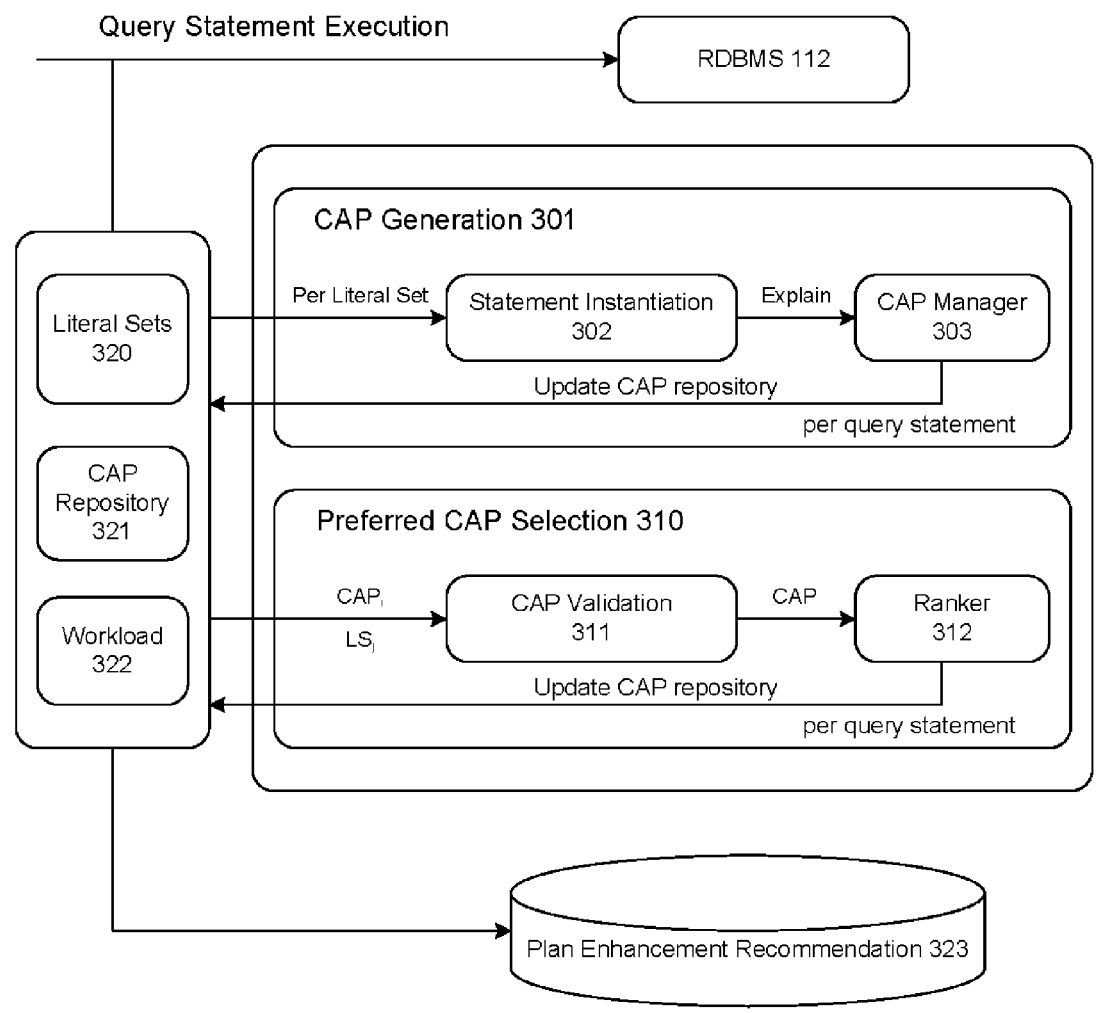
FIG. 3 illustrates program code modules for an embodiment of the method for adaptive execution plan enhancement according to the present invention.

FIG. 3 illustrates program code modules for an embodiment of the method for adaptive execution plan enhancement according to the present invention. This embodiment comprises two main modules, a critical access path (CAP) generation module 301 and a preferred CAP selection module 310. A CAP is the optimal access path selected by the optimizer when the variables in the predicates of the underlying query statement are substituted by the corresponding literals. The CAP generation module 301 includes a statement instantiation module 302 and a CAP manager 303. The preferred CAP selection module 310 includes a CAP validation module 311 and a ranker 312. In storage 319 are literal sets 320 harvested from the execution histories of query statements, a CAP repository 321 of CAP generated, and the workload 322 for an application. The resulting plan enhancement recommendation 323 is stored as well.

Figure 4:
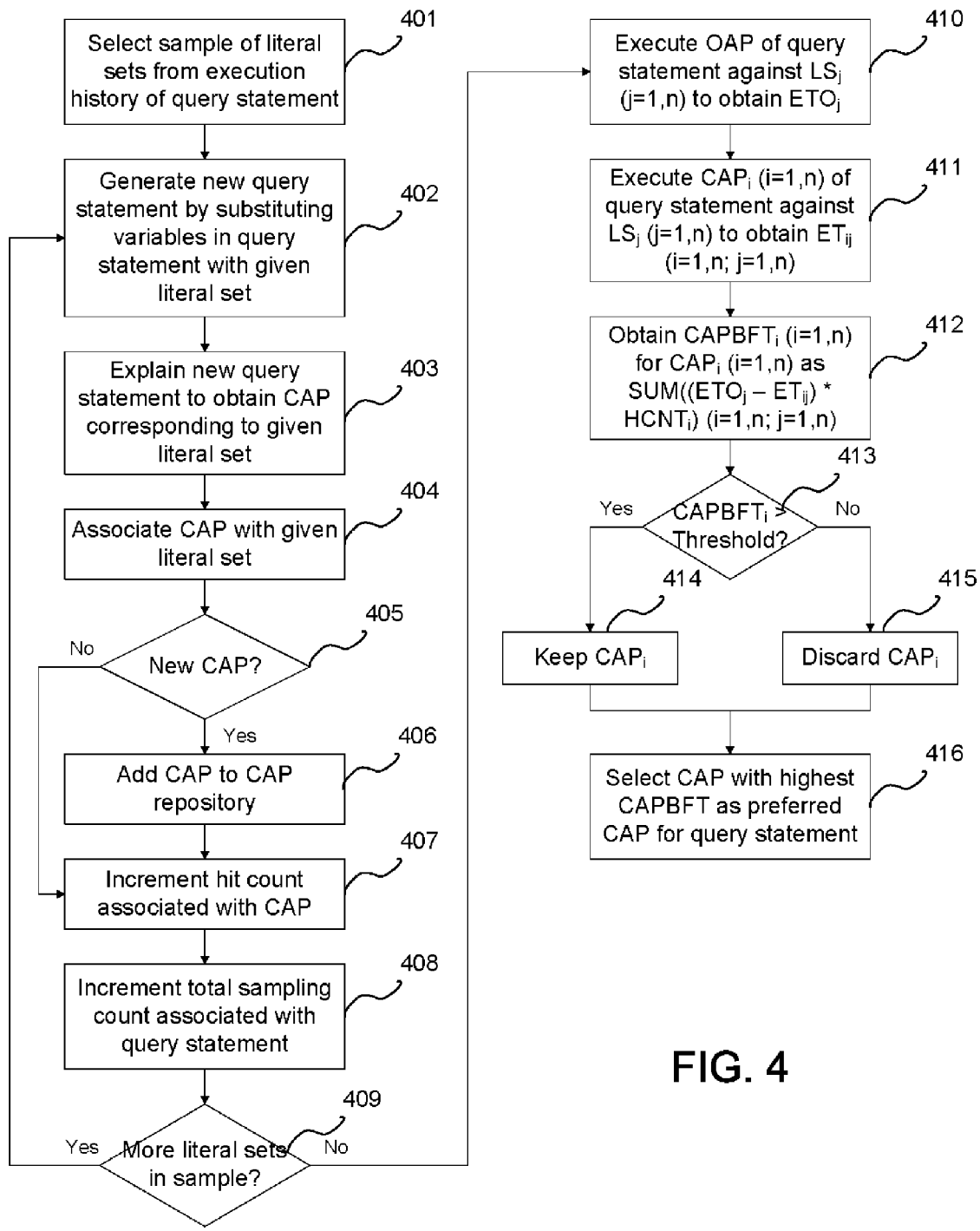
FIG. 4 is a flowchart illustrating in more detail the method for adaptive query execution plan enhancement according to the present invention.

FIG. 4 is a flowchart illustrating in more detail the method for adaptive query execution plan enhancement according to the present invention. Each query statement in the application workload 322 is processed to obtain a set of CAP's. Referring to both FIGS. 3 and 4, first, a sample of literal sets 320 is selected from the execution history of the query statement (401). For each given literal set in the sample, the statement instantiation module 302 generates a new query statement by substituting the variables in the query statement with the given literal set (402), explains the new query statement to obtain the CAP corresponding to the given literal set (403), and associates the CAP with the given literal set (404). In this embodiment, the new statement is explained to obtain the explain information, which should include the predicate selectivity. The original query statement is then explained using the predicate selectivity, resulting in an access path that is the CAP for the given literal set.

The CAP manager 303 then updates the CAP repository 321. When the CAP manager 303 determines that the CAP obtained by the statement instantiation module 302 is a new CAP (405), i.e., not previously obtained, the CAP is added to the CAP repository 321 (406). Otherwise, the CAP need not be added as it already exists in the CAP repository 321. The CAP manager 303 increments a hit count associated with the CAP (407) and a total sampling count associated with the query statement (408). Each CAP in the CAP repository 321 is associated with a hit count, which indicates the number of times the CAP is generated by the CAP generation module 301. Each query statement is associated with a total sampling count, which indicates the number of literal sets processed by the CAP generation module 301 for the query statement. The hit counts and the total sampling count are used in the selection of a preferred CAP, which is described further below.

If there are more literal sets in the sample (409), the CAP generation module 301 repeats the above processing for the next literal set. Thus, the CAP generation module 301 processes each literal set in the sample for a query statement, and does so for each query statement submitted for such processing.

Once each literal set in the sample is processed, the preferred CAP selection module 310 selects the preferred CAP for each query statement based on the total benefit of each CAP. In describing the preferred CAP selection module 310, the following will be used:

OAP=original access path for query statement

CAP$_i$=critical access paths for query statement, where i=1, n

LS$_j$=literal sets associated with CAP$_i$, where i=1, n

HCNT$_i$=hit count for CAP$_i$, where i=1, n

ETO$_j$=elapsed time for executing OAP against LS$_j$, where j=1, n

ET$_{ij}$=elapsed time for executing CAP$_i$ against LS$_j$, where i=1, n and j=1, n CAPBFT$_i$=total benefit for CAP$_i$, where i=1, n Here, n=total sampling count associated with the query statement. Once each literal set in the sample is processed, the CAP validation module 311 of the preferred CAP selection module 310 executes the OAP and each of the CAPs against each of the literal sets to obtain their corresponding elapsed time for execution. More specifically, the CAP validation module 311 executes the OAP of the query statement against LS$_j$ (where j=1, n) to obtain ETO$_j$ (where j=1, n) (410), and executes CAP$_i$ (where i=1, n) against LS$_j$ (where j=1,n) to obtain ET$_{ij}$ (where i=1, n and j=1, n) (411). This results in the elapsed time for execution of the original access path against each literal set and the elapsed time for execution of each CAP against each literal set. With these elapsed times, the CAP validation module 311 is able to obtain the total benefit for each CAP, the total benefit being the difference between the elapsed time for execution of the original access path and the elapsed time for a CAP, weighted by the hit count for the CAP. More specifically, the CAP validation module 311 obtains CAPBFT$_i$ (where i=1, n) for CAP$_i$ (where i=1, n) as SUM ((ETO$_j$−ET$_{ij}$)*HCNT$_i$) (where i=1, n and j=1, n) (412).

Optionally, a threshold benefit may be pre-defined, such that a CAP would not be considered in the selection of the best CAP for a query statement unless the total benefit for the CAP (CAPBFT$_i$) exceeds the threshold. For example, a threshold of "0" (zero) would mean that any amount of benefit would be considered. When the CAPBFT$_i$ of CAP$_i$ fails to exceed the threshold (413), the ranker 312 discards CAP$_i$ (415). Otherwise, the ranker 312 keeps, or considers, CAP$_i$ (414). From the CAP's not discarded, the ranker 312 selects the CAP with the highest CAPBFT as the preferred CAP for the query statement (416). The CAP repository 321 is then updated to indicate the selection of the preferred CAP. The preferred CAP selection module 310 repeats the above process for each query statement of the workload 322 submitted for such processing.

Once the processing of each query statement is completed, and the preferred CAP for each query statement is selected, the preferred CAP's for the workload 322 are collected as the plan enhancement recommendation 323 to users. The recommendation may be implemented in various ways. For example, for database servers that support optimization hints, the plan enhancement recommendation may be implemented through a hint to lock down the access path. For applications where static profiling is supported, a "static version" of the query statement may be obtained by binding the original query statement with the variables replaced by corresponding literal set. The static profiling will then route the execution of the original query statement to its static counterpart, whose access path is locked down by the preferred CAP for the query statement.

Although the present invention is described above with the total benefit calculated from elapsed times for executing access paths, other parameters may be used to calculate the total benefit without departing from the spirit and scope of the present invention. For example, the in situ time, i.e., time spent by a CPU, for each access path may be used instead.

The embodiments of the present invention may be run on the application client in the background periodically or as desired. Any number of query statements of an application may be submitted for processing, including those manually selected by a user.

The descriptions of the various embodiments of the present invention has been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for adaptive query execution plan enhancement by a computer system comprising a processor, comprising:

selecting a sample of literal sets from an execution history of a query statement;

determining a plurality of access paths by applying each literal set in the sample to the query statement, comprising, for each given literal set in the sample:

generating a new query statement by substituting variables in the query statement with the given literal set;

explaining the new query statement to obtain a given critical access path;

associating the given critical access path with the given literal set; and incrementing a total sampling count associated with the query statement;

for each given access path of the plurality of access paths, determining a total execution cost by applying each literal set in the sample to the given access path; and selecting a preferred access path from the plurality of access paths based on the total execution costs for each given access path.

2. A method for adaptive query execution plan enhancement by a computer system comprising a processor, comprising:

selecting a sample of literal sets from an execution history of a query statement;

determining a plurality of access paths by applying each literal set in the sample to the query statement, comprising, for each given literal set in the sample:

generating a new query statement by substituting variables in the query statement with the given literal set;

explaining the new query statement to obtain a given critical access path;

associating the given critical access path with the given literal set;

incrementing a hit count associated with the given critical access path; and incrementing a total sampling count associated with the query statement;

for each given access path of the plurality of access paths, determining a total execution cost by applying each literal set in the sample to the given access path; and selecting a preferred access path from the plurality of access paths based on the total execution costs for each given access path.

3. The method of claim 2, wherein the determining the total execution cost by applying each literal set in the sample to the given access path comprises:

determining an elapsed time for execution of an original access path of the query statement against each literal set in the sample;

for each given critical access path, determining an elapsed time for execution of the given critical access path against each literal set in the sample; and for each given critical access path, obtaining a total benefit for the given critical access path based on differences between the elapsed time for execution of the original access path and the elapsed time for execution of the given critical access path against each literal set in the sample, weighted by the hit count associated with the given critical access path.

4. The method of claim 3, wherein the selecting the preferred access path from the plurality of access paths based on the total execution costs for each given access path comprises:
selecting the given critical access path with a highest total benefit as the preferred access path for the query statement.

5. The method of claim 4, wherein the selecting the given critical access path with a highest total benefit as the preferred access path for the query statement comprises:
for each given critical access path, determining whether the total benefit for the given critical access path exceeds a pre-defined threshold;
for each given critical access path, in response to determining that the total benefit for the given critical access path does not exceed the pre-defined threshold, discarding the given critical access path; and
selecting, from the non-discarded given critical access paths, the given critical access path with the highest total benefit as the preferred access path for the query statement.

6. The method of claim 2, further comprising:
collecting a plurality of preferred access paths for a plurality of query statements in an application workload; and
presenting the plurality of preferred access paths as a query execution plan enhancement recommendation.

7. A computer program product for adaptive query execution plan enhancement, the computer program product comprising:
a non-transitory computer readable memory having computer readable program code embodied therewith, the computer readable program code configured to:
select a sample of literal sets from an execution history of a query statement;
determine a plurality of access paths by applying each literal set in the sample to the query statement, comprising, for each given literal set in the sample:
generating a new query statement by substituting variables in the query statement with the given literal set;
explaining the new query statement to obtain a given critical access path;
associating the given critical access path with the given literal set; and
incrementing a total sampling count associated with the query statement;
for each given access path of the plurality of access paths, determine a total execution cost by applying each literal set in the sample to the given access path; and
select a preferred access path from the plurality of access paths based on the total execution costs for each given access path.

8. A computer program product for adaptive query execution plan enhancement, the computer program product comprising:
a non-transitory computer readable memory having computer readable program code embodied therewith, the computer readable program code configured to:
select a sample of literal sets from an execution history of a query statement;
determine a plurality of access paths by applying each literal set in the sample to the query statement, comprising, for each given literal set in the sample:
generate a new query statement by substituting variables in the query statement with the given literal set;
explain the new query statement to obtain a given critical access path;
associate the given critical access path with the given literal set;
increment a hit count associated with the given critical access path; and
increment a total sampling count associated with the query statement;
for each given access path of the plurality of access paths, determine a total execution cost by applying each literal set in the sample to the given access path; and
select a preferred access path from the plurality of access paths based on the total execution costs for each given access path.

9. The computer program product of claim 8, wherein the computer readable program code configured to determine the total execution cost by applying each literal set in the sample to the given access path is further configured to:
determine an elapsed time for execution of an original access path of the query statement against each literal set in the sample;
for each given critical access path, determine an elapsed time for execution of the given critical access path against each literal set in the sample; and
for each given critical access path, obtain a total benefit for the given critical access path based on differences between the elapsed time for execution of the original access path and the elapsed time for execution of the given critical access path against each literal set in the sample, weighted by the hit count associated with the given critical access path.

10. The computer program product of claim 9, wherein the computer readable program code configured to select the preferred access path from the plurality of access paths based on the total execution costs for each given access path is further configured to:
select the given critical access path with a highest total benefit as the preferred access path for the query statement.

11. The computer program product of claim 10, wherein the computer readable program code configured to select the given critical access path with a highest total benefit as the preferred access path for the query statement is further configured to:
for each given critical access path, determine whether the total benefit for the given critical access path exceeds a pre-defined threshold;
for each given critical access path, in response to determining that the total benefit for the given critical access path does not exceed the pre-defined threshold, discard the given critical access path; and
select, from the non-discarded given critical access paths, the given critical access path with the highest total benefit as the preferred access path for the query statement.

12. The computer program product of claim 8, wherein the computer readable program code is further configured to:

collect a plurality of preferred access paths for a plurality of query statements in an application workload; and present the plurality of preferred access paths as a query execution plan enhancement recommendation.

13. A system comprising:

a processor; and a computer readable memory having computer readable program code embodied therewith, the computer readable program code configured to:

select a sample of literal sets from an execution history of a query statement;

determine a plurality of access paths by applying each literal set in the sample to the query statement, comprising, for each given literal set in the sample:

generate a new query statement by substituting variables in the query statement with the given literal set;

explain the new query statement to obtain a given critical access path;

associate the given critical access path with the given literal set; and increment a total sampling count associated with the query statement;

for each given access path of the plurality of access paths, determine a total execution cost by applying each literal set in the sample to the given access path; and select a preferred access path from the plurality of access paths based on the total execution costs for each given access path.

14. A system, comprising:

a processor; and a computer readable memory having computer readable program code embodied therewith, the computer readable program code configured to:

select a sample of literal sets from an execution history of a query statement;

determine a plurality of access paths by applying each literal set in the sample to the query statement, comprising, for each given literal set in the sample:

generate a new query statement by substituting variables in the query statement with the given literal set;

explain the new query statement to obtain a given critical access path;

associate the given critical access path with the given literal set;

increment a hit count associated with the given critical access path; and increment a total sampling count associated with the query statement;

for each given access path of the plurality of access paths, determine a total execution cost by applying each literal set in the sample to the given access path; and select a preferred access path from the plurality of access paths based on the total execution costs for each given access path.

15. The system of claim 14, wherein the computer readable program code configured to determine the total execution cost by applying each literal set in the sample to the given access path is further configured to:

determine an elapsed time for execution of an original access path of the query statement against each literal set in the sample;

for each given critical access path, determine an elapsed time for execution of the given critical access path against each literal set in the sample; and for each given critical access path, obtain a total benefit for the given critical access path based on differences between the elapsed time for execution of the original access path and the elapsed time for execution of the given critical access path against each literal set in the sample, weighted by the hit count associated with the given critical access path.

16. The system of claim 15, wherein the computer readable program code configured to select the preferred access path from the plurality of access paths based on the total execution costs for each given access path is further configured to:

select the given critical access path with a highest total benefit as the preferred access path for the query statement.

17. The system of claim 16, wherein the computer readable program code configured to select the given critical access path with a highest total benefit as the preferred access path for the query statement is further configured to:

for each given critical access path, determine whether the total benefit for the given critical access path exceeds a pre-defined threshold;

for each given critical access path, in response to determining that the total benefit for the given critical access path does not exceed the pre-defined threshold, discard the given critical access path; and select, from the non-discarded given critical access paths, the given critical access path with the highest total benefit as the preferred access path for the query statement.

18. The system of claim 14, wherein the computer readable program code is further configured to:

collect a plurality of preferred access paths for a plurality of query statements in an application workload; and present the plurality of preferred access paths as a query execution plan enhancement recommendation.

\* \* \* \* \*